United States Patent [19]

Matouka

[11] Patent Number: 4,481,866
[45] Date of Patent: Nov. 13, 1984

[54] POWER STEERING GEAR WITH VARIABLE RATE TORSION BAR FOR OPTIMIZED STEERING

[75] Inventor: Michael F. Matouka, Utica, Mich.

[73] Assignee: General Motors Corporation, Detroit, Mich.

[21] Appl. No.: 544,256

[22] Filed: Oct. 21, 1983

[51] Int. Cl.³ .............................................. F15B 9/10
[52] U.S. Cl. .............................. 91/375 A; 91/391 R; 180/148
[58] Field of Search ................... 91/375 A, 391 R; 180/143, 148

[56] References Cited

U.S. PATENT DOCUMENTS

| | | | |
|---|---|---|---|
| 3,022,772 | 2/1962 | Zeigler et al. | 91/375 A |
| 3,408,900 | 11/1968 | Tomita | 91/375 A |
| 3,465,842 | 9/1969 | Hruska | 180/143 |
| 3,930,554 | 1/1976 | Ward | 91/375 A |
| 3,998,131 | 12/1976 | Adams | 91/375 A |
| 4,034,825 | 7/1977 | Adams | 91/375 A |
| 4,177,714 | 12/1979 | Schuckebier | 91/375 A |

*Primary Examiner*—Paul E. Maslousky
*Attorney, Agent, or Firm*—Charles R. White

[57] ABSTRACT

Vehicle power steering gear with a torsion bar whose stiffness is adjusted by an axially shiftable nut that provides a movable gripping point for one end of the torsion bar whose position determines the pliable length of the bar and the steering effort required to steer the vehicle.

3 Claims, 4 Drawing Figures

POWER STEERING GEAR WITH VARIABLE RATE TORSION BAR FOR OPTIMIZED STEERING

This invention relates to vehicle steering and more particularly to a new and improved power steering gear with a variable rate torsion bar to vary the amount of power steering assist to match power steering demand.

Various power steering gears utilize a rotary valve with rotary valve elements interconnected by an elongated torsion bar for effecting power steering of a vehicle under a wide range of steering load conditions. An illustrative power steering gear is shown in the Ziegler et al U.S. Pat. No. 3,022,772 issued Feb. 27, 1962 for Rotary Power Steering Valve With Torsion Bar Centering hereby incorporated by reference. The power steering gear of the present invention is of this general category and additionally advantageously utilizes a mechanism for adjusting the spring rate of the torsion bar so that the output of the power steering gear can be changed between maximum assist when maximum steering loads are needed and minimum assist when there are minimum steering loads such as at highway cruising.

Power steering gears such as exemplified in the Zeigler et al patent incorporate a torsion bar to control the amount of power assist needed for highly effective vehicle steering. When parking for example, resistance at the road wheels is high so that there is maximum deflection of the torsion bar interconnecting the rotary valving components so that there is maximum pressure across the piston nut or other piston components producing the power assist output for steering. When the vehicle accelerates, wheel resistance progressively decreases and at highway speeds, the assist or gain is low. This provides improved operating efficiency since the power steering pump is not being used for steering purposes. While the prior art power steering gears as described are highly effective, this invention provides an advancement in power steering since it effectively tailors the steering gear to provide maximum assist when needed and minimum assist when power steering requirements are at a minimum.

In accordance with the present invention, the power steering assist is tailored with precision to match steering requirements so that there is high assist when required as when parking and little or no assist, i.e. manual steering when steering requirements are low such as that steady state highway cruising. More particularly, in this invention the stiffness of the torsion bar is adjusted by effectively adjusting its length so that the power assist is maximized when requirements are maximum and which exists through a varying range of hydraulic assist to a substantially all mechanical drive when assist requirements are at a minimum such as when driving at steady state conditions.

It is a feature, object and advantage of this invention to provide a new and improved torsion bar power steering gear having a wide range of gain between high gain when steering resistance at the dirigible road wheels is high and low gain when steering resistance at the road wheels is low.

These and other features, objects and advantages of this invention will be more apparent from the following detailed description and drawing in which.

Figure 1:
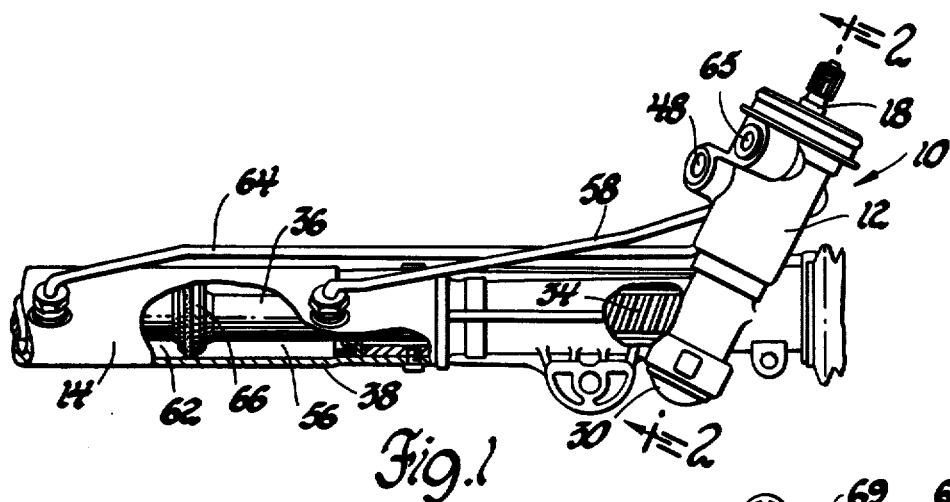
FIG. 1 is an elevational view with parts broken away of a portion of an integral power steering gear embodying this invention.
Figure 2:
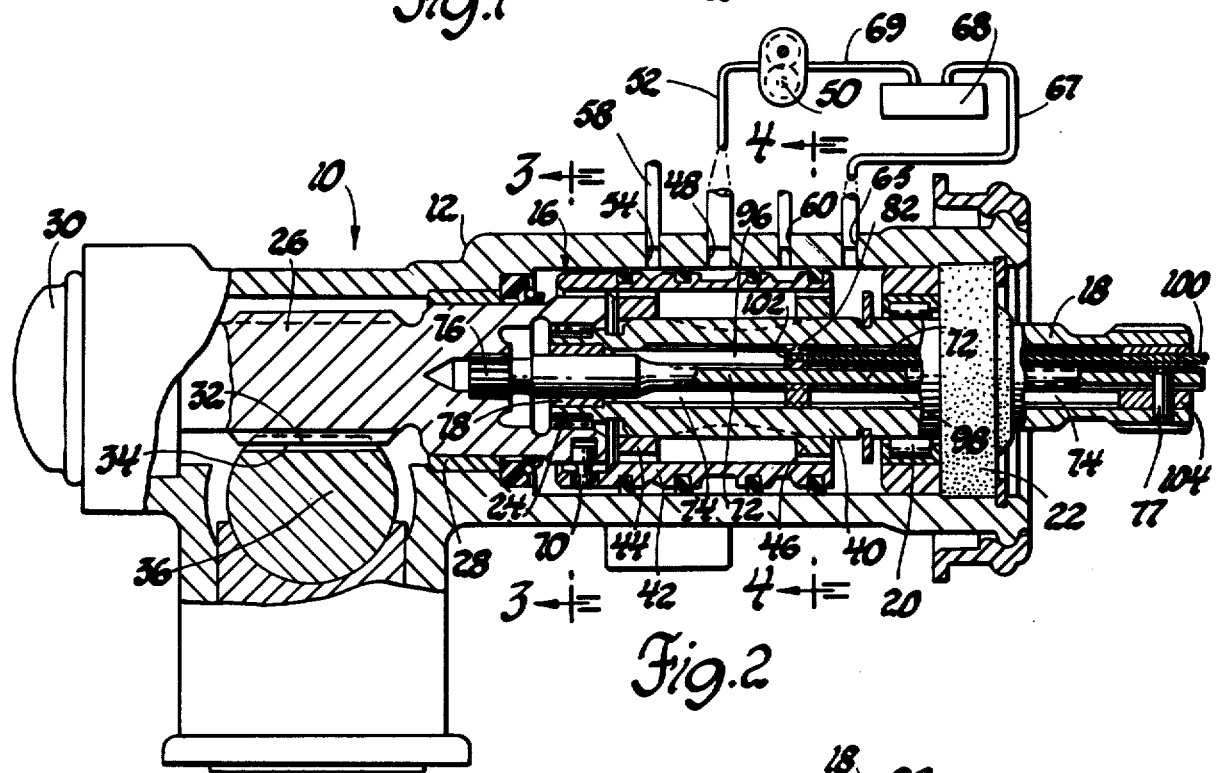
FIG. 2 is a sectional view of a rotary valve of the integral gear of this invention taken along lines 2—2 of FIG. 1 and modified to diagrammatically include external hydraulic circuitry.
Figure 3:
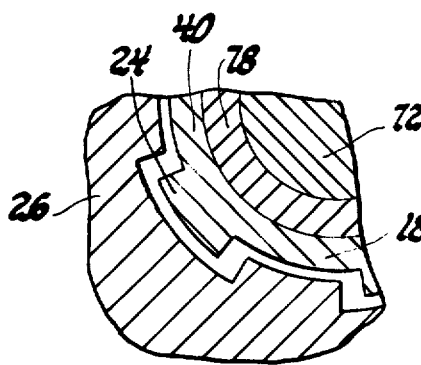
FIG. 3 is a sectional view taken along lines 3—3 of FIG. 2 illustrating the spline interconnection between the valve body and the power steering gear pinion of this invention.
Figure 4:
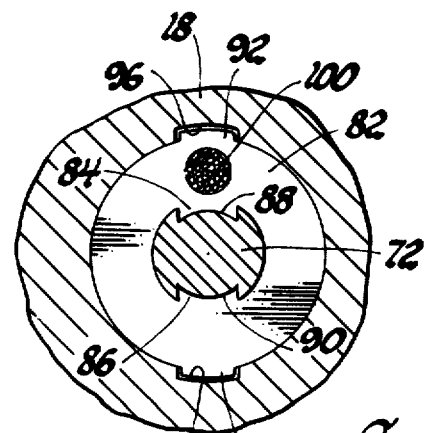
FIG. 4 is a cross-sectional view taken along lines 4—4 of FIG. 2 showing an improved torsion bar and torsion bar mounting arrangement for varying torsion bar stiffness of this invention.

Turning now in greater detail to the drawing, FIG. 1 shows an integral rack and pinion steering gear 10 having a valve housing 12 and a power cylinder 14 coupled thereto. The valve housing in FIG. 2 has a rotary power steering valve assembly 16 mounted therein for actuation by the vehicle operator to effect power assist steering of the dirigible wheels of a vehicle not illustrated. The valve assembly 16 includes an elongated cylindrical spool shaft 18 mounted for turning movement in the valve housing by a bearing assembly 20. The spool shaft projects through an annular fluid seal 22, closing the upper end of the housing, and is connected by a conventional steering shaft to a suitable steering wheel not shown. The lower end of the spool shaft 18 is splined at 24 with conventional and predetermined tooth clearance ($\pm 7.5°$ for example) before mechanical drive to a pinion gear 26 rotatably mounted in the housing 12 by a sleeve bearing 28. A cup-like cover 30 fits into the end of the valve housing 12 at the lower end of the rotary valve to provide a removable access cover therefor. This loose fit of the splines, illustrated by FIG. 3 allows operation of the rotary valve assembly 16 further described below As shown in FIG. 2, the teeth 32 of pinion 26 mesh with the teeth 34 of an elongated rack 36 mounted for linear sliding movement within the housing 12 and the connected cylindrical housing 38 of the power cylinder 14. The opposite ends of the rack 36 are operatively connected to the dirigible wheels of the vehicle by suitable ball joints and tie rods such as disclosed in U.S. Pat. No. 4,351,228 issued Sept. 28, 1982 to Shultz et al for Power Assist Steering Gear hereby incorporated by reference. With such an arrangement, the linear movement of the rack 36 in response to rotational input through pinion 26 and assist from the power cylinder as described below turns the dirigible wheels of the vehicle for vehicle steering purposes.

The rotary valve assembly 16 includes cylindrical valve spool 40 formed on the inner end portion of the spool shaft 18 and a cylindrical valve body 42 mounted around the valve spool on end rings 44, 46 which are in turn pressed onto the valve spool 40.

The rotary valve assembly is generally the same in construction and operation as the rotary valve shown and disclosed in the patent to Ziegler et al cited above or patent application to Spann, U.S. Ser. No. 375,715 filed May 7, 1982 for Power Steering Gear and Open Center Rotary Valve Therefor, assigned to the assignee of this invention and hereby incorporated by reference. Valve assembly 16 has inlet pressure port 48 connected to engine driven hydraulic pump 50 by a line 52. Port 54 in the valve housing is connected to left turn pressure chamber 56 in the power cylinder housing 38 by line 58.

Port 60 in the valve housing is connected to right turn pressure chamber 62 by line 64. Piston 66 fixed on the rack 36 is slidably mounted in power cylinder housing 38 and separates the left and right turn pressure chambers 56 and 62. Port 65 in the valve body is an exhaust port connected by line 67 to a reservoir 68 that is hydraulically connected to pump 50 by line 69.

The lower end of the cylindrical valve body 42 extends over the upper end of pinion 26 and is drivingly connected thereto by a radial pin 70. An elongated torsion bar 72 extends concentrically through an axial passage 74 in the spool shaft 18 to provide a centering spring effectively interconnecting the valve spool 40 and the valve body 42. The lower end of the torsion bar 72 is rigidly secured to the pinion 26 by splined connection 76. The upper end is pinned at 77. As will be described below, the torsion bar is coupled to the spool shaft at selected positions along the length thereof to vary the spring rate. A sleeve bearing 78 supports the inner end of the spool shaft on a cylindrical portion of the torsion bar inboard of the splined connection 76 as illustrated.

With this torsional spring interconnection and the loose spline fit 24, the valve spool can be turned relative to the valve body when there is sufficient turning resistance at the road wheels so that the valve routes pressure oil for left or right turn power assist steering. On completion of the steered turn and termination of the rotational input, the valve body and spool are centered by the torsion bar to terminate power assist steering as explained in the Zeigler et al patent cited above.

In this invention, the torsion bar is adjustable in effective length to provide variable stiffness so that a wide range of steering conditions encountered by the vehicle operator can be met effectively utilizing the power steering gear and yet not be wasteful of assist energy when not required. To this end, in the preferred embodiment of the invention the input side of the torsion bar 72 if fitted with an adjustable anchor nut 82 which has diametrically opposed and inwardly projecting keys 84, 86 which slide in keyways 88, 90 in the torsion bar 72. The nut also has outwardly projecting keys 92, 94 which slide in longitudinally extending keyways 96, 98 formed in the internal wall of the spool shaft. An elongated flexible actuator cable 100 is threadedly connected at its inner end to the nut 82 at 102. This cable extends from this connection through passage 74 in the spool shaft and through an end closure 104 to an actuator convenient to the vehicle operator not illustrated. The operator can accordingly position the nut at positions along the torsion bar to change the spring rate according to steering conditions encountered.

In operation and assuming the power steering requirements are high as when parking the vehicle or moving from a tight and cramped parking location, the steering resistance as the road wheels are high, the operator will, by using cable 100, position the nut 82 at the far right-hand side of the spool shaft so that the torsion bar is at its maximum pliancy. Thus, there is low resistance to the relative turning of the valve body and valve spool when the stub shaft is turned so that the ports are opened to provide the maximized power steering for maneuvering. As the vehicle speed and momentum increases, power steering requirements are reduced so that the vehicle operator can position the nut at a mid position. Under such conditions, steering "feel" is increased since manual steering effort through the torsion bar will turn the pinion gear without operation of the valve in many instances. This reduces power steering demand and provides some increase in vehicle operating economy. If the torsion bar 18 twists after intermediate hand wheel loading, power assist becomes available as needed. Assuming that little or no power assist is needed, such as at highway cruising and the operator desires tight "feel" and operating economy typical of manual steering, the nut can be positioned to the far left. Under such conditions, there is manual input to the rack and pinion gear through the stiff or high rate torsion bar without effecting the relative turning of the valve components. Power steering occurs when high resistance is met at the road wheels as described above. While manual cable means has been disclosed as one mechanism for moving the nut 82, it can be pushed left or right by the use of fluids and moved as a function of vehicle speed.

While the above arrangement shows preferred embodiments of the invention, it will be apparent that other embodiments will now become know to those skilled in the art. Accordingly, this invention is limited in scope by the accompanying claims which encompass these and other embodiments of this invention.

The embodiments of the invention in which an exclusive property or privilege is claimed are defined as follows:

1. In a vehicle, a power steering gear providing power steering assist effort comprising a housing, an input shaft mounted for turning movement in said housing in response to steering effort by a vehicle operator, output gearing operatively mounted for turning movement in said housing and having output means extending outward from said housing, hydraulic power actuator means operatively mounted in said housing for moving said output means, rotary valve means in said housing operatively connected to a source of pressurized hydraulic fluid for selectively supplying and exhausting pressurized fluid to and from said actuator means to effect the hydraulic power movement of said actuator means and said output means, said valve means comprising a valve body member drivingly connected to said output gearing and a valve spool member connected to said input shelf, lost motion connector means operatively connecting said output gearing to said valve spool member and thereby to said input shaft to permit the vehicle operator to mechanically move said actuator means in said housing, elongated torsion bar means having an outer end portion and an inner end, said torsion bar means extending into said input shaft and operatively connected to said output gearing and to said input shaft to provide a centering spring interconnection between said valve body member and said valve spool member, fixed retainer means for securing said inner end of said torsion bar means to said output gearing and axially shiftable retainer means axially spaced from said retainer means for securing said outer end portion of said torsion bar means to said input shaft at any selected one of a plurality of positions spaced from said innner end of said torsion bar to thereby control the effective torsion bar length and stiffness so that manual steering effort can be variably set between maximum effort at minimum spacing and minimum effort at maximum spacing and operator means extending into said valve spool for moving said shiftable retainer means.

2. In a vehicle, a power steering gear providing power steering assist effort comprising a housing, an input shaft mounted for turning movement in said housing in response to steering effort by a vehicle operator, output gearing operatively mounted for turning movement in said housing and having output means extending outward from said housing, hydraulically powered actuator means operatively mounted in said housing for moving said output means, rotary valve means in said housing operatively connected to a source of pressurized hydraulic fluid for selectively suppplying and exhausting pressurized fluid to and from said actuator means to effect the hydraulic powered movement of said actuator means and said output means, said valve means comprising a valve body member drivingly connected to said output gearing and a valve spool member connected to said input shaft, lost motion connector means operatively connecting said output gearing to said valve spool member and thereby to said input shaft to permit the vehicle operator to mechanically move said actuator means in said housing, elongated torsion bar means having an inner end and an outer end portion and extending into said input shaft and operatively connected to said output gearing and to said shaft to provide a contering spring connnection between said valve body and said valve spool members, fixed retainer means for securing said inner end of said torsion bar means to said output gearing and axially shiftable retainer means axially spaced from said fixed retainer means operatively interconnnecting said outer end portion of said torsion bar means and said input shaft at selected positions spaced from said fixed retainer means so that the spring rate of said torsion bar can be changed by the vehicle operator to provide manual steering at vehicle highway speeds and maximum power steering at low vehicle speeds and when parking the vehicle.

3. In a vehicle, a power steering gear providing power steering assist effort comprising a housing, an input shaft mounted for turning movement in said housing in response to steering effort by a vehicle operator, output gearing operatively mounted for turning movement in said housing and having output means extending outward from said housing, hydraulically power actuator means operatively mounted in said housing for moving said output means, rotary valve means in said housing operatively connected to a source of pressurized hydraulic fluid for selectively supplying and exhausting pressurized fluid to and from said actuator means to effect the hydraulic powered movement of said actuator means and said output means, said valve means comprising a valve body memeber drivingly connected to said output gearing and a valve spool member connected to said input shaft, lost motion connector means operatively connecting said output gearing to said valve spool member and thereby to said input shaft to permit the vehicle operator to mechanically move said actuator means in said housing, elongated torsion bar means having an inner end and an outer end portion extending into said input shaft and operatively connected to said output gearing and to said input shaft to provide a centering spring connection between said valve body member and said valve spool member, fixed retainer means for securing said inner end of said torsion bar means to said output gearing and axially shiftable nut means axially spaced from said fixed retainer means and slidably connected to said torsion bar means and said input shaft for securing said outer end portion of torsion bar means to said input shaft at selected positions from said inner end of said torsion bar to thereby control the effective torsion bar length and stiffness so that manual steering effort can be variably set between maximum effort at minimum spacing and minimum effort at maximum spacing and elongated operator means extending into said valve spool means and operatively connected to said nut means for shifting said nut means.

* * * * *